United States Patent
Chou et al.

(10) Patent No.: US 11,335,296 B2
(45) Date of Patent: May 17, 2022

(54) LOW-LATENCY CONTEXT SWITCH SYSTEMS AND METHODS

(71) Applicant: Apple Inc., Cupertino, CA (US)

(72) Inventors: Jim C. Chou, San Jose, CA (US); Honkai Tam, Cupertino, CA (US); Roy G. Moss, Palo Alto, CA (US); Arthur L. Spence, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/020,710

(22) Filed: Sep. 14, 2020

(65) Prior Publication Data
US 2022/0084482 A1   Mar. 17, 2022

(51) Int. Cl.
| | |
|---|---|
| *G09G 5/00* | (2006.01) |
| *G06F 3/14* | (2006.01) |
| *G06T 11/60* | (2006.01) |
| *G06F 3/147* | (2006.01) |

(52) U.S. Cl.
CPC ........... *G09G 5/003* (2013.01); *G06F 3/1407* (2013.01); *G06F 3/147* (2013.01); *G06T 11/60* (2013.01); *G09G 2310/02* (2013.01); *G09G 2360/18* (2013.01)

(58) Field of Classification Search
CPC .............. G09G 5/003; G09G 2310/02; G09G 2360/18; G06T 11/60; G06F 3/147; G06F 3/1407
See application file for complete search history.

(56) References Cited

U.S. PATENT DOCUMENTS

| | | | | |
|---|---|---|---|---|
| 10,356,167 | B1* | 7/2019 | Dolas | H04L 67/1034 |
| 2002/0085493 | A1* | 7/2002 | Pekkala | H04L 47/39 370/235 |
| 2011/0025709 | A1* | 2/2011 | Ptucha | G06T 11/60 345/629 |
| 2016/0259671 | A1 | 9/2016 | Gosalia et al. | |
| 2018/0365062 | A1* | 12/2018 | Roberts | G06F 9/4881 |
| 2020/0320761 | A1* | 10/2020 | Agarwal | G06K 9/00228 |

FOREIGN PATENT DOCUMENTS

EP    0475421 A2    3/1992

* cited by examiner

*Primary Examiner* — Sahlu Okebato

(74) *Attorney, Agent, or Firm* — Fletcher Yoder P.C.

(57) ABSTRACT

An electronic device includes a display panel and image processing circuitry. The image processing circuitry receives input image data corresponding to an image to display on the display panel, modifies the input image data by executing a first context task (e.g., lower priority task), and receives a context switch request. The image processing circuitry also pauses modification of the input image data by pausing execution of the first context task and then switches to modifying the input image data by executing a second context task (e.g., higher priority task).

20 Claims, 7 Drawing Sheets

LOW-LATENCY CONTEXT SWITCH SYSTEMS AND METHODS

BACKGROUND

The present disclosure relates generally to image processing and, more particularly, to switching between presently processing tasks for image data used to display images on an electronic display.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices often use one or more electronic display to present visual representations of information (e.g., text, still images, video) based on corresponding image data. For example, such electronic devices may include computers, mobile phones, portable media devices, virtual-reality headsets, and vehicle dashboards, among many others. In any case, to display an image, an electronic display may control light emission (e.g., luminance) of its display pixels based at least in part on corresponding image data. To facilitate improving perceived image quality, in some instances, an electronic device may include a display pipeline (e.g., image data processing circuitry) that processes image data before an electronic display uses the image data to display a corresponding image (e.g., image frame).

Generally, image data may indicate a resolution (e.g., dimensions of pixels to be used) corresponding with an image. However, in some instances, it may be desirable to modify the image data, such as by scaling or rotating, prior to processing the image data for display. For example, a display pipeline may scale the image data for a higher resolution, for example, to display on an electronic display with a higher resolution output. Thus, before displaying the image data on the electronic display, the image data processing circuitry may execute a scaling task to convert the image data to a desired resolution. In other instances, it may be desirable to rotate the image in a vertical and/or a horizontal direction prior to processing the image data for display, and thus, the image data processing circuitry may execute a rotating task to convert the image data to a particular orientation prior to processing the image data for display. These tasks, and other image adjusting tasks, may be associated with different priority levels, such that a task type associated with a higher priority takes precedence over another task type associated with a lower priority. However, once the image data processing circuitry begins executing the lower priority task, stopping the lower priority task and switching to executing the higher priority task may be difficult.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment an electronic device includes a display panel and image processing circuitry. The image processing circuitry receives input image data corresponding to an image to display on the display panel, modifies the input image data by executing a first context task, and receives a context switch request. The image processing circuitry also pauses modification of the input image data by pausing execution of the first context task and then switches to modifying the input image data by executing a second context task.

In another embodiment, image processing circuitry receives an input image corresponding to an image, modifies the input image based on a first context, and receives an indication to modify the input image based on a second context. Moreover, the image processing circuitry determines that the modification of the input image is within a threshold line boundary, stops modification of the input image data, and stores a state associated with the modification of the input image based on the first context. Additionally, the image processing circuitry switches to modifying the input image based on the second context.

In yet another embodiment, a tangible, non-transitory, computer-readable medium, includes instructions (e.g., firmware) that, when executed by a processor, cause operation to be performed. The operations include receiving an input image corresponding to an image for display on a display panel, modifying the input image based on a first context corresponding to a first configuration of image processing blocks of a display pipeline of the display panel, and receiving a context switch request to modify the input image based on a second context corresponding to a second configuration of the image processing blocks. Moreover, the operations include determining that the modification of the input image is within a threshold line boundary, stopping modification of the input image, and storing a configuration state associated with the modification of the input image based on the first context in a spill buffer. Furthermore, the operations include modifying the input image based on the second context, and resuming modification of the input image based on the first context using the stored configuration state in response to completing modification of the input image based on the second context.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
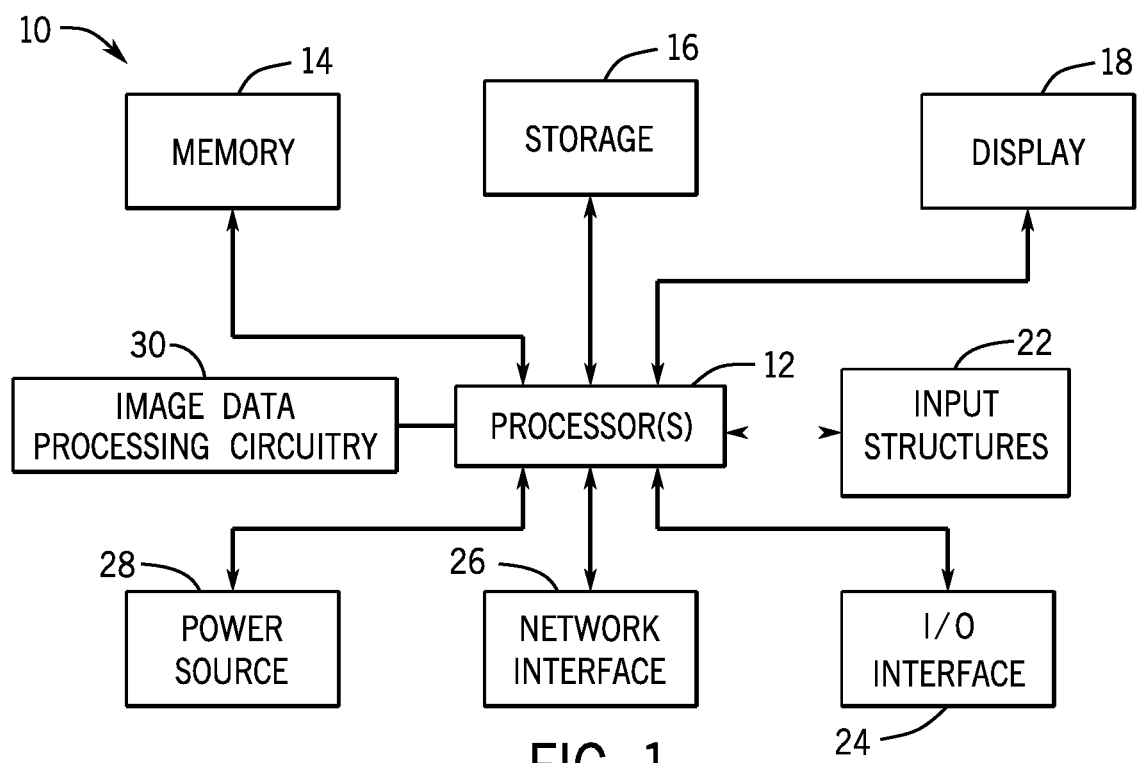
FIG. 1 is a block diagram of an electronic device that includes an electronic display, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure generally relates to electronic displays, which may be implemented to display image frames. Generally, an electronic display may display an image by controlling light emission and, thus, the luminance of each display pixel based at least in part on corresponding image data. Image data processing circuitry, such as a memory-to-memory scaler and rotator (MSR) and/or a display pipeline may be implemented to process image data before an electronic display uses the image data to display a corresponding image. The display pipeline, for example, may include image data processing circuitry organized into one or more image data processing blocks that sequentially perform various operations on image data.

The MSR of the image data processing circuitry may perform a scaling or a rotating task (e.g., modification operation) on the image data, such that the image data may correspond to scaled image (e.g., higher resolution output) or a rotated image (e.g., vertical or horizontal) before or after processing the image data for display on the electronic display. Each of these operations, the scaling task and the rotating task, may be associated with a particular configuration of the image data processing circuitry.

The image data processing circuitry may include a configuration buffer that stores configuration entries corresponding to configuration data to configure the image data processing circuitry. In particular, the configuration entries may identify a corresponding image data processing block to be programmed using the configuration data, for example, for each task type (e.g., scaling and/or rotating tasks). After configuration, the image data processing circuitry may process image data during an image data processing period, for example, to scale or rotate image data. As such, switching from performing the scaling task to the rotating task may include changing configuration data to configure the image data processing circuitry of the display pipeline accordingly.

In general, the image data processing circuitry may complete execution of one task before moving onto executing the next task. However, in some instances, the image data processing circuitry may be in the process of executing a lower priority task, which may also be time consuming. When a higher priority task appears, it could be problematic for the image data processing circuitry to wait until it finishes executing the lower priority task.

As such, the present disclosure provides techniques for pausing and switching (e.g., context switch of tasks) between configurations of the image data processing circuitry, for example, to facilitate performing a higher priority task while a lower priority task is presently executing. Additionally, in some embodiments, the configuration state of the paused lower priority task may be stored and retrieved to facilitate resuming execution of the lower priority task after the image data processing circuitry completes execution of the higher priority task. That is, the image data processing circuitry may switch between the configuration data associated with the task types stored in the configuration buffer and/or store the configuration data for the presently executed lower priority task, for example, in another buffer (e.g., a spill buffer).

With the foregoing in mind, FIG. 1 illustrates an electronic device 10 according to an embodiment of the present disclosure may include, among other things, one or more processor(s) 12, memory 14, nonvolatile storage 16, a display 18, input structures 22, an input/output (I/O) interface 24, a network interface 26, a power source 28, and an image data processing circuitry 30. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in electronic device 10.

Figure 2:
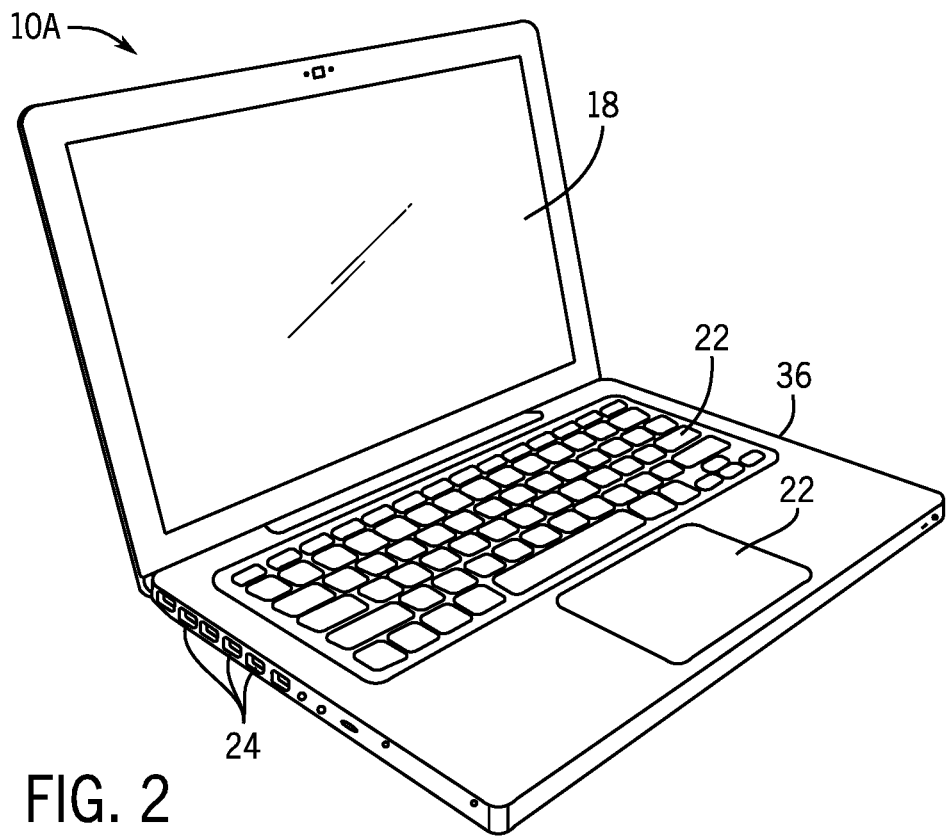
FIG. 2 is an example of the electronic device of FIG. 1, in accordance with an embodiment.
Figure 4:
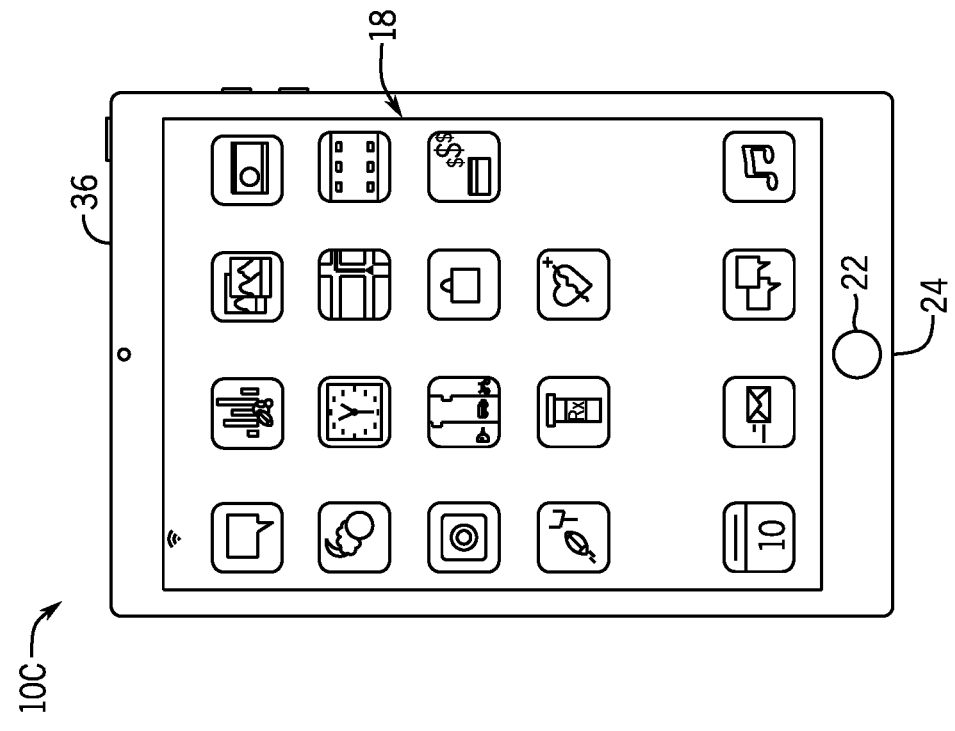
FIG. 4 is another example of the electronic device of FIG. 1, in accordance with an embodiment.
Figure 3:
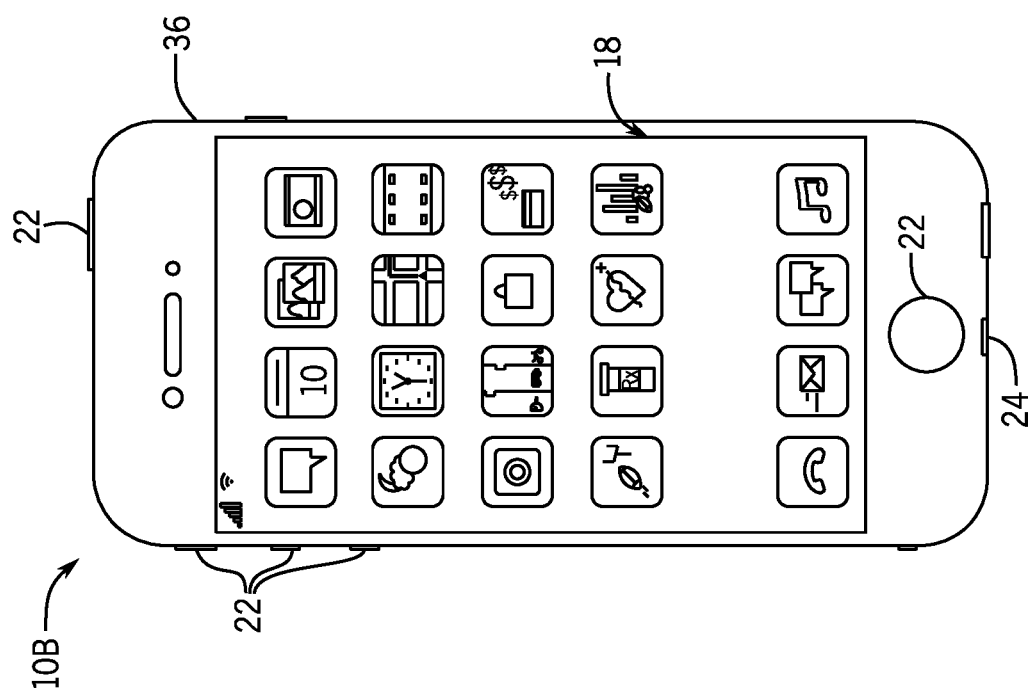
FIG. 3 is another example of the electronic device of FIG. 1, in accordance with an embodiment.
Figure 5:
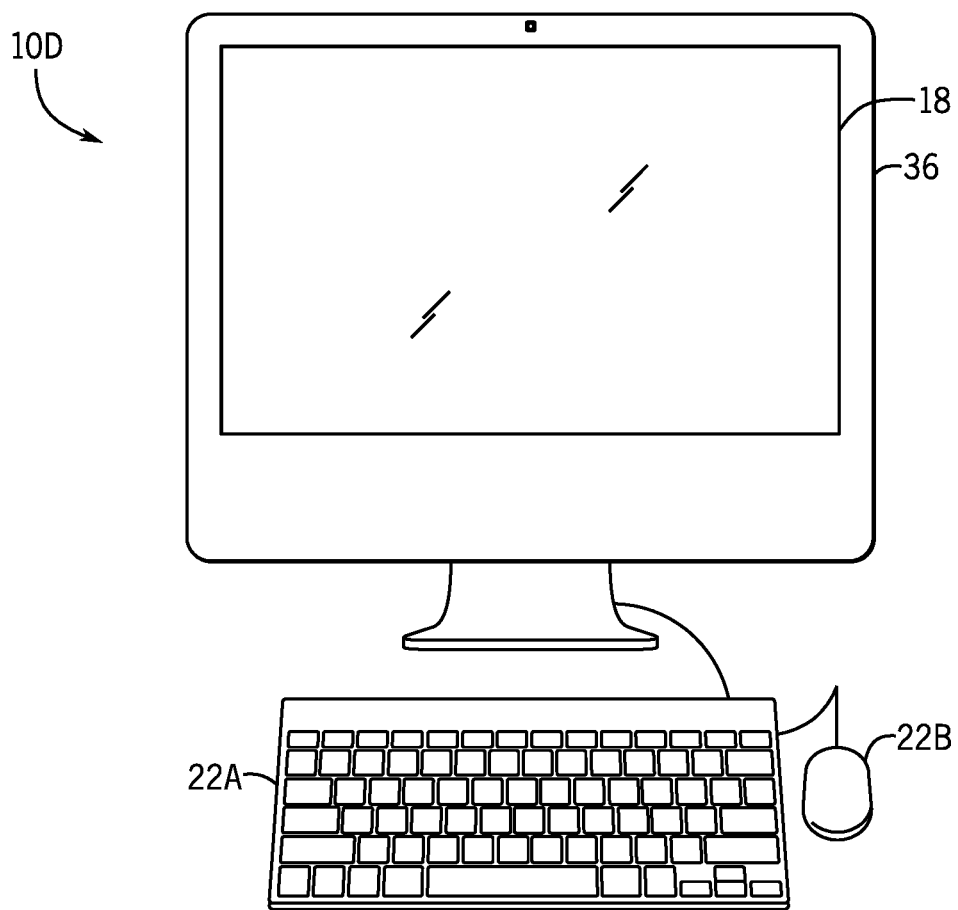
FIG. 5 is another example of the electronic device of FIG. 1, in accordance with an embodiment.
Figure 6:
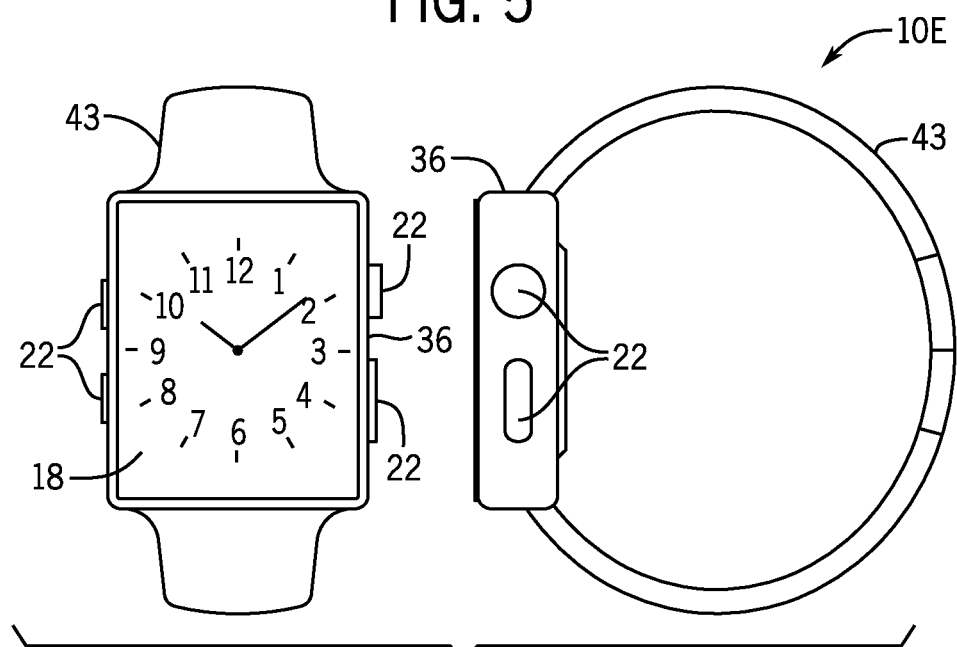
FIG. 6 is another example of the electronic device of FIG. 1, in accordance with an embodiment.

By way of example, the electronic device 10 may represent a block diagram of the notebook computer depicted in FIG. 2, the handheld device depicted in FIG. 3, the handheld device depicted in FIG. 4, the desktop computer depicted in FIG. 5, the wearable electronic device depicted in FIG. 6, or similar devices. It should be noted that the processor(s) 12 and other related items in FIG. 1 may be generally referred to herein as "data processing circuitry." Such data processing circuitry may be embodied wholly or partially as software and/or hardware. Additionally, the image data processing circuitry 30 (e.g., a graphics processing unit) may be included in the processor(s) 12. The processor(s) 12 and other related items in FIG. 1 may be a single contained processing module or may be incorporated wholly or partially within any of the other elements within the electronic device 10. In general, it should be noted that the various depicted components may be combined into fewer components or separated into additional components. For example, the memory 14 and the nonvolatile storage 16 may be included in a single component.

In the electronic device 10 of FIG. 1, the processor(s) 12 may be operably coupled with a memory 14 and a nonvolatile storage 16 to perform various algorithms. For example, algorithms or instructions (e.g., software) for generating and/or transmitting image data, switching between tasks executed by the image data processing circuitry 30 of a display pipeline to adjust image data, and/or saving configuration data associated with a presently executed task. Such algorithms or instructions executed by the processor(s) 12 may be stored in any suitable article of manufacture that includes one or more tangible, computer-readable media. For example, the tangible, computer-readable media may include the memory 14 and/or the nonvolatile storage 16, individually or collectively, to store the algorithms or instructions. In particular, the memory 14 and the nonvolatile storage 16 may include any suitable articles of manufacture for storing data and executable instructions, such as random-access memory (RAM), read-only memory (ROM), rewritable flash memory, hard drives, and optical discs. In addition, programs (e.g., an operating system) encoded on such a computer program product may also include instructions that may be executed by the processor(s) 12 to enable the electronic device 10 to provide various functionalities. The processor(s) 12 may include one or more general purpose microprocessors, one or more application specific integrated circuits (ASICs) and/or one or more field programmable logic arrays (FPGAs).

The display 18 may include any suitable electronic display, which may facilitate users to view images generated on the electronic device 10. In some embodiments, the display 18 may include one or more light-emitting diode (LED) displays, organic light-emitting diode (OLED) displays, active-matrix organic light-emitting diode (AMOLED) displays, or some combination of these and/or other display technologies. The display 18 may also include a self-emissive pixel array having an array of one or more of self-emissive pixels. In such embodiments, the display 18 may include any suitable circuitry to drive the self-emissive pixels, such as display drivers like row drivers and/or column drivers. Each of the self-emissive pixel may include any suitable light emitting element, such as an LED, one example of which is an OLED. However, any other suitable type of pixel, including non-self-emissive pixels (e.g., liquid crystal as used in liquid crystal displays (LCDs), digital micromirror devices (DMD) used in DMD displays) may also be used.

Additionally, the display 18 may control light emission from the display pixels to present visual representations of information based on image data corresponding to the visual representations of information. For example, the display 18 may present graphics including a graphical user interface (GUI) of an operating system, an application interface, a still image, video content, or the like by displaying frames based at least in part on image data. In particular, the display 18 may be operably coupled to the processor(s) 12 and the image data processing circuitry 30 so that the display 18 may display frames based on the image data generated by the processor(s) 12, the image data processing circuitry 30, or the like. As will be described herein, the display 18 may receive the frames of image data via the network interface 26, the input structures 22, and/or the I/O interface 24.

The image data processing circuitry 30 may include one or more image processing blocks, such a scaler block and/or a rotator block to perform a scaling task or a rotating task on image data, respectively. In some instances, and as will be described herein, the tasks may be associated with higher or lower priorities. The processor(s) 12 may change configuration of the image processing circuitry, such as to use or not use certain image processing blocks, based on the task. Moreover, while the image data processing circuitry 30 adjusts the image data by executing a task, the processor(s) may implement a context switch request to pause a presently executed task, and switch to executing a different context task. Here, the context may be associated with priority so that the image data processing circuitry 30 may switch from executing a lower priority task to a higher priority task. As previously mentioned, the processor(s) may store the state of the paused task prior to pausing. Thus, the processor(s) may resume the paused task after executing the higher priority task at the point at which executing the lower priority task was paused. This may provide lower latency, for example, than restarting the paused task after completing the higher priority task. Additionally, the ability to reconfigure the image processing circuitry for the higher priority task may be especially beneficial when the presently executed lower priority task is substantially time consuming (e.g., relative to the time for completing the higher priority task).

The input structures 22 of the electronic device 10 may enable a user to interact with the electronic device 10 (e.g., pressing a button to increase or decrease a volume level). In some embodiments, the input structures 22 may include touch-sensing components in the display 12. The touch sensing components may receive user inputs by detecting occurrence and/or position of an object touching the surface of the electronic display 12.

The I/O interface 24 may enable the electronic device 10 to interface with various other electronic devices, as may the network interface 26, such as receive the image data. The network interface 26 may include, for example, one or more interfaces for a personal area network (PAN), such as a BLUETOOTH® network, for a local area network (LAN) or wireless local area network (WLAN), such as an 802.11x WI-FI® network, and/or for a wide area network (WAN), such as a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, and/or New Radio (NR) cellular network. In particular, the network interface 26 may include, for example, one or more interfaces for using a Release-15 cellular communication standard of the 5G specifications that include the millimeter wave (mmWave) frequency range (e.g., 30-300 GHz). In some embodiments, a transceiver of the electronic device 10 may allow communication over the aforementioned networks (e.g., 5G, Wi-Fi, LTE-LAA, and so forth). The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

The power source 28 may provide electrical power to one or more components in the electronic device 10, such as the processor(s) 12 and/or the electronic display 12. Thus, the power source 28 may include any suitable source of energy, such as a rechargeable lithium polymer (Li-poly) battery and/or an alternating current (AC) power converter. The power source 28 may use distribution rails and/or additional smaller power sources within the electronic device 10 to aid in supplying power to the one or more components.

In certain embodiments, the electronic device 10 may take the form of a computer, a portable electronic device, a wearable electronic device, or other type of electronic device. Such computers may be generally portable (such as laptop, notebook, and tablet computers), or generally used in one place (such as desktop computers, workstations, and/or servers). In certain embodiments, the electronic device 10 in the form of a computer may be a model of a MacBook®, MacBook® Pro, MacBook Air®, iMac®, Mac® mini, or Mac Pro® available from Apple Inc. of Cupertino, Calif. By way of example, the electronic device 10, taking the form of a notebook computer 10A, is illustrated in FIG. 2 in accordance with one embodiment of the present disclosure. The depicted notebook computer 10A may include a housing or enclosure 36, a display 18, input structures 22, and ports of an I/O interface 24. In one embodiment, the input structures 22 (such as a keyboard and/or touchpad) may be used to interact with the computer 10A, such as to start, control, or operate a graphical user interface (GUI) and/or applications running on computer 10A. For example, a keyboard and/or touchpad may allow a user to navigate a user interface and/or an application interface displayed on display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPhone® available from Apple Inc. of Cupertino, Calif. The handheld device 10B may include an enclosure 36 to protect interior components from physical damage and/or to shield them from electromagnetic interference. The enclosure 36 may surround the display 18. The I/O interfaces 24 may open through the enclosure 36 and may include, for example, an I/O port for a hardwired connection for charging and/or content manipulation using a standard connector and protocol, such as the Lightning connector provided by Apple Inc. of Cupertino, Calif., a universal serial bus (USB), or other similar connector and protocol.

The input structures 22, in combination with the display 18, may allow a user to control the handheld device 10B. For example, the input structures 22 may activate or deactivate the handheld device 10B, navigate user interface to a home screen, a user-configurable application screen, and/or activate a voice-recognition feature of the handheld device 10B. Other input structures 22 may provide volume control, or may toggle between vibrate and ring modes. The input structures 22 may also include a microphone that may obtain a user's voice for various voice-related features, and a speaker that may enable audio playback and/or certain phone capabilities. The input structures 22 may also include a headphone input that may provide a connection to external speakers and/or headphones.

FIG. 4 depicts a front view of another handheld device 10C, which represents another embodiment of the electronic device 10. The handheld device 10C may represent, for example, a tablet computer, or one of various portable computing devices. By way of example, the handheld device 10C may be a tablet-sized embodiment of the electronic device 10, which may be, for example, a model of an iPad® available from Apple Inc. of Cupertino, Calif.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a MacBook®, or other similar device by Apple Inc. of Cupertino, Calif. It should be noted that the computer 10D may also represent a personal computer (PC) by another manufacturer. A similar enclosure 36 may be provided to protect and enclose internal components of the computer 10D, such as the display 18. In certain embodiments, a user of the computer 10D may interact with the computer 10D using various peripheral input structures 22, such as the keyboard 22A or mouse 22B (e.g., input structures 22), which may connect to the computer 10D.

Similarly, FIG. 6 depicts a wearable electronic device 10E representing another embodiment of the electronic device 10 of FIG. 1 that may be configured to operate using the techniques described herein. By way of example, the wearable electronic device 10E, which may include a wristband 43, may be an Apple Watch® by Apple Inc. of Cupertino, Calif. However, in other embodiments, the wearable electronic device 10E may include any wearable electronic device such as, for example, a wearable exercise monitoring device (e.g., pedometer, accelerometer, heart rate monitor), or other device by another manufacturer. The display 18 of the wearable electronic device 10E may include a touch screen display 18 (e.g., LCD, LED display, OLED display, active-matrix organic light emitting diode (AMOLED) display, and so forth), as well as input structures 22, which may allow users to interact with a user interface of the wearable electronic device 10E.

Figure 7:
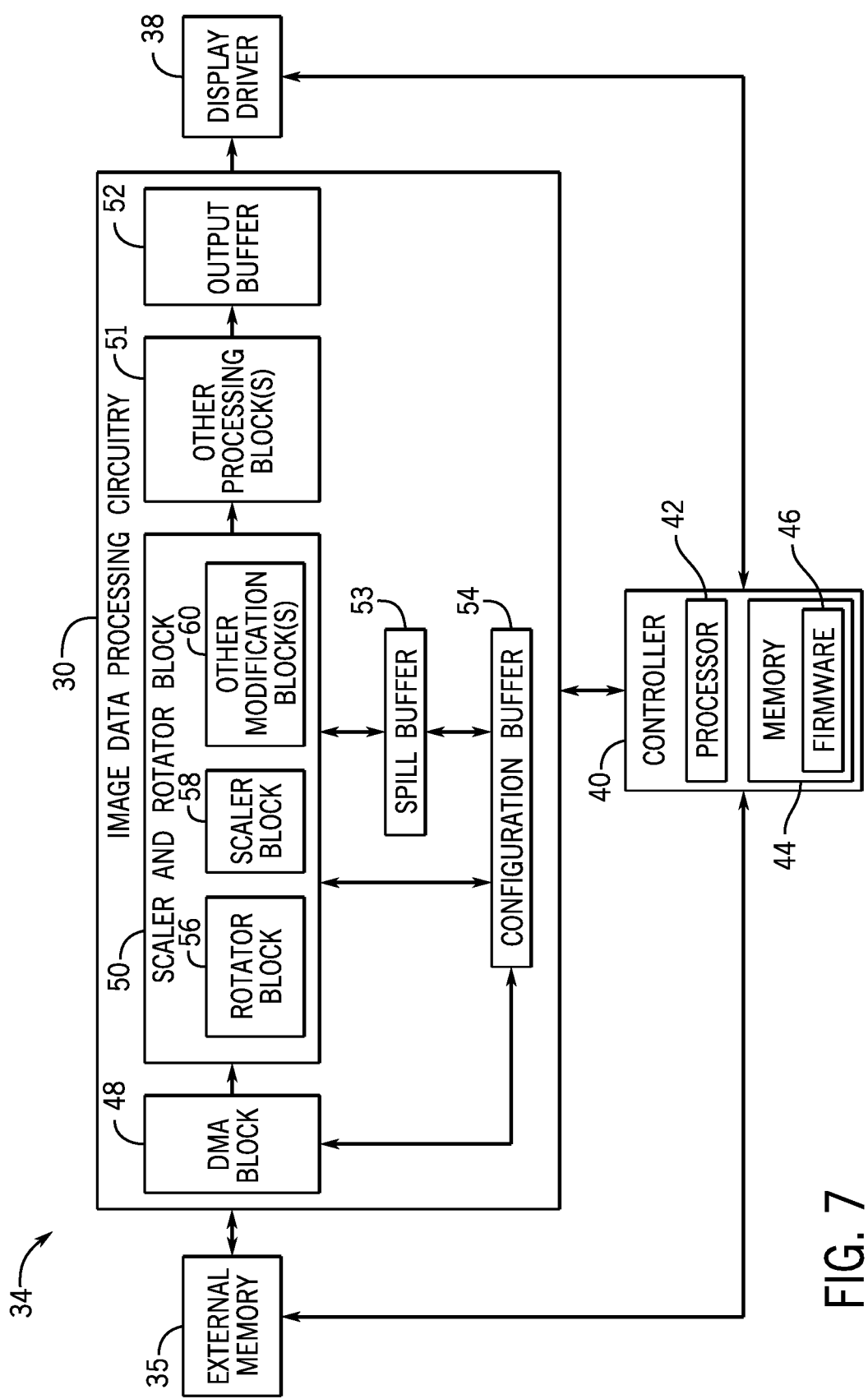
FIG. 7 is a block diagram of an image processing system of the electronic device of FIG. 1, in accordance with an embodiment.

As described above, the display 18 may display images based on image data received from an image data source. To help illustrate, FIG. 7 illustrates a block diagram of an image processing system 34 of the electronic device 10 that includes image data processing circuitry 30. In general, the image processing system 34 includes an external memory 35, the image data processing circuitry 30, a display driver 38, and a controller 40. The image data processing circuitry 30 retrieves, processes, and outputs image data. In particular, the image data processing circuitry 30 may receive image data from the external memory 35 (e.g., memory 14 of FIG. 1), analyze and/or process it, for example, by scaling and/or rotating the image data before displaying an image using the image data or storing it in the external memory 35 for memory-to-memory processing.

By way of example, the image data processing circuitry 30 may directionally scale the image data to a higher resolution and/or rotate it to a different orientation, and subsequently store it in memory for additional processing (e.g., to display on the display 18). It should be appreciated that a display pipeline 36 may be implemented in the electronic device 10 and/or the display 18. For example, the image data processing circuitry 30 may be included in the processor(s) 12, the image data processing circuitry 30, a timing controller (TCON) in the display 18, other one or more processing units, and/or other processing circuitry. Further, it should be appreciated that the electronic device 10 and/or display 18 may have one or more display pipelines 36.

In some embodiments, the image data processing circuitry 30 may be operatively coupled to the display driver 38 that generates and supplies analog and/or digital electrical signals to display pixels of the display 18 based at least in part on the image data. The system controller 40 may control operations of the external memory 35, the image data processing circuitry 30, the display driver 38, and/or other portions of the electronic device 10. It is noted that the image data processing circuitry 30 may also include control circuitry, such as control circuitry similar to the system controller 40.

The system controller 40 may include a controller processor 42 and controller memory 44. The controller processor 42 may execute instructions, such as a firmware 56, stored in the controller memory 44, the external memory 35, the nonvolatile device 16 and/or the memory 14 (e.g., of FIG. 1), a separate tangible, non-transitory, and/or computer readable medium. The controller processor 42 may include the processor(s) 12, the image data processing circuitry 30, a timing controller in the display 18, and/or a separate processing module. Although depicted as a system controller 40, one or more separate system controllers 40 may be used to control operation of the electronic device 10.

As depicted, the image data processing circuitry 30 includes a direct memory access (DMA) block 48, a scaler and rotator block 50, any other suitable processing blocks 51, an output buffer 52, a spill buffer 53, and a configuration buffer 54. The DMA block 48 may provide the image data processing circuitry 30 access to the external memory 35 (e.g., memory external to the image data processing circuitry 30). For example, the DMA block 48 may retrieve (e.g., read) image data from the external memory 35 for processing via image data processing blocks of the image data processing circuitry 30, such as the scaler and rotator block 50 and the other processing blocks 51. Additionally or alternatively, the DMA block 48 may store (e.g., write) processed image data in the external memory 35, for example, after scaling and/or rotating.

As shown, the image data processing circuitry 30 may include multiple image processing blocks (e.g., the image data processing circuitry 30), including but not limited to, the scale and rotator block 50 and the other processing blocks 51 (e.g., dither block). In the depicted embodiment, the scaler and rotator block 50 includes a scaler block 56, a rotator block 58, and any other suitable modification block 60 (e.g., flipping block, mirroring block, etc.). Although the scaler block 56, the rotator block 58, and the other modification block 60 are shown as separate blocks, which represents a particular embodiment, the functions performed by these blocks may be integrated into a single block.

The scaler block 56 may adjust image data (e.g., via directional scaling and/or enhancement), for example, to facilitate reducing the likelihood of or correcting for image artifacts generally associated with scaling. As an illustrative example, it may be desirable to increase the resolution of image data to enlarge viewing of the corresponding image or accommodate the resolution of a display 18. To accomplish this, the scaler block 56 may employ noise statistics and/or sum of absolute differences (SAD) and differential (DIFF) statistics to analyze the content of the image data and scale the image data to a higher resolution while maintaining image definition (e.g., sharpness). In some embodiments, the image data may also undergo enhancement.

The rotator block 58 may adjust the image data, for example, to facilitate reducing the likelihood of or correcting for image artifacts generally associated with rotating. The rotator block 58 may include one or more rotator cores that include memories and buffers to perform image rotation. As will be described with respect to FIG. 8, the DMA block 48 may fetch image data for one or more pixels or subpixels from the external memory 35, rotate the image data for the entire image and/or blocks of the image data (e.g., 96 pixels by 96 pixels, 128 pixels by 128 pixels, and so forth), and write the rotated image data back to the external memory 35. The rotator block 58 may adjust the image data by rotating the image data by a predetermined rotation increment, such as by 10°, 15°, 45°, 90°, and/or 180°, to produce the rotated image. In some embodiments, and as will be described herein, the rotator block 58 may be used and/or initialized when the electronic device 10 is rotated (e.g., user switches from a vertical view to a horizontal view), and thus, its display 18 is rotated. In this manner, orientation of the image data adapts to the orientation of the display 18. In some embodiments, a rotating task performed by the rotator block 58 may be a higher priority task than a scaling task performed by the scaler block 56. As such, a context switch may be implemented to switch from performing the lower priority scaling task to the higher priority rotating task.

The other modification block 60 may include additional processing blocks related to scaling and/or rotation, and the other processing block 51 may include a variety of image data processing blocks corresponding to a variety of functions. By way of example, the other processing block 51 may include a Sub-Pixel Uniformity Compensation (SPUC) block that applies a voltage offset to each sub-pixel to compensate for voltage non-uniformity, a burn-in compensation (BIC)/burn-in statistics (BIS) block that processes image data according to a desired configuration (e.g., apply a computed gain to compensate for burn-in effects), ambient adaptive pixel (AAP) block, a dynamic pixel backlight (DPB) block, a white point correction (WPC) block, a sub-pixel layout compensation (SPLC) block, a panel response correction (PRC) block, a dithering block, an image signal processor (ISP) block, a content frame dependent duration (CDFD) block, an ambient light sensing (ALS) block, or any combination thereof.

The spill buffer 53 may include one or more buffers that store data associated with a stopped or paused task. Specifically, after the processors(s) receive a context switch request, and as will be described with respect to FIG. 9 and FIG. 10, the processor(s) may store volatile state information associated with the lower priority task in the spill buffer. Specifically, the processors(s) may store a bit address for retrieval, a size specifying size of the spill buffer 53 (e.g., task configuration or state prior to stopping), a task identification (ID) of the stopped task, a number of clock cycles that occurred from starting the task until pausing the task, the configuration of the image data processing circuitry 30, and/or other configuration related data for the stopped task, in the spill buffer 53. In this manner, implementing a context switch for the image data processing circuitry 30 executing the lower priority task to executing the higher priority task, may allow the reconfiguring the image data processing circuitry 30 to resume executing the lower priority task upon completing the higher priority task. Resuming execution of the lower priority task in the state (e.g., 50% completed) prior to stopping execution, may allow saving time that may be associated with restarting the lower priority task.

The configuration buffer 54 may store configuration entries. The configuration entries may be associated with image data and may indicate how the image data processing circuitry 30 of the image data processing circuitry 30, such as the scale and rotator block 50, should process the image data. The configuration buffer 54 may include a buffer that holds configuration information, which may change between image frames. The configuration information may include configuration data for programmable registers of the blocks (e.g., one or more programmable registers for the scaler block 56, one or more programmable registers for the rotator block 58, and so forth) in the image data processing circuitry 30 of display pipeline 36. That is, the configuration buffer 54 may hold queued image frame configuration entries for potentially multiple image frames in advance. During a blanking period, the image data processing circuitry 30 may load the programmable registers with the configuration entries stored in the configuration buffer 54, thereby enabling the different configurations of the image data processing circuitry 30 for different image frames. For example, a configuration for an image frame may include media tile with color format YCbCr10 and have a rotation of 90° from the original image data. However, the configuration for the next image frame may include a rotation of 180°.

In some embodiments, the configuration buffer 54 may include a shadow FIFO buffer. FIFOs are memory buffers that may behave elastically between synchronous and asynchronous systems by storing data (e.g., queued configuration entries) as received and outputting the data to a system on a first-in-first-out basis. A shadow FIFO buffer operates according to the first-in-first-out principal and contains one or more shadow registers. Shadow registers are used to reduce register load and/or store overhead when invoked (e.g., requested during a handling interrupt) as they may serve as a copy of general purpose registers. For example, a FIFO interrupt may request loading data in a shadow register to the programmable register. In such instances, the data may be provided directly to the programmable register without any RAM cycles (e.g., memory bus requests). Although the following descriptions describe the configuration buffer 54 as a shadow FIFO buffer, which represents a particular embodiment, the configuration buffer 54 may be any suitable memory buffer that may store configuration entries.

Once the image data has been processed by the image data processing circuitry 30 (e.g., the scale and rotator block 50 and/or the other processing block 51) according to the configuration entries transmitted by the configuration buffer 54, the processor(s) may temporarily store the processed image data in the output buffer 52 before the display driver 38 or a display panel of the device 10 retrieve the processed image data. The output buffer 52 may act as a reservoir for processed image data, storing multiple image frames at any given time. As such, the output buffer 52 may prevent lag in displaying a new image frame on the display 18 when requested by the display driver 38. Further, the display driver 38 may be a semiconductor integrated device that functions as an interface between, for example, the image data processing circuitry 30 and the display 18, and may be used to drive each pixel display line in an allotted amount of time.

Generally, the configuration buffer 54 may serially load the programmable registers with configuration entries corresponding to one image frame. Serial transmission, however, may be relatively slow and because the transmission of configuration entries only occurs during the blanking, the duration of the blanking period may increase to ensure complete transmission of configuration entries corresponding to an image frame. To compensate, the line-time duration may decrease and, thus, so may the display pixel driving time.

Figure 8:
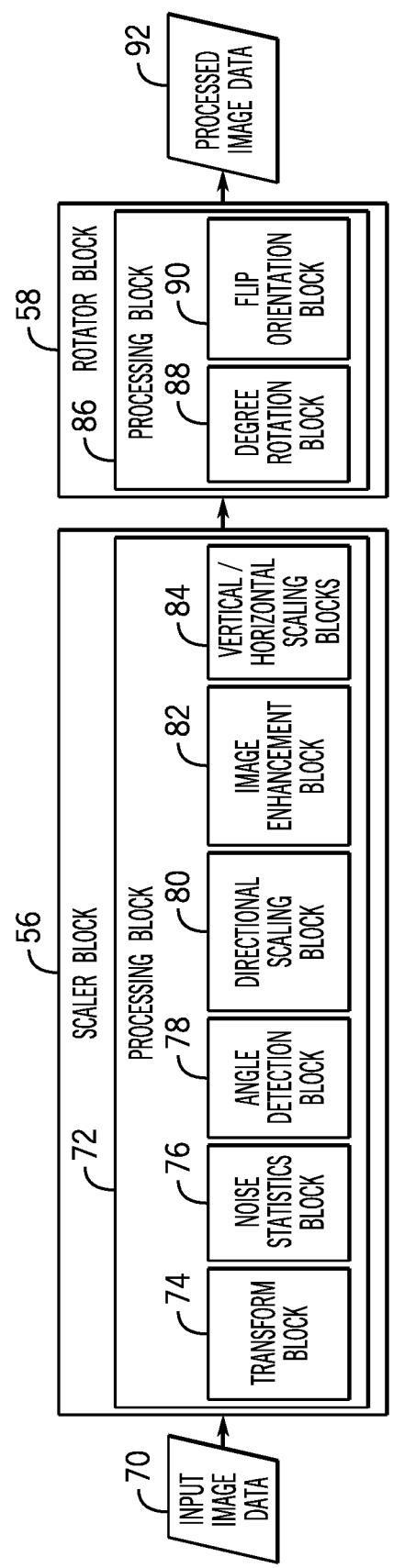
FIG. 8 is a block diagram of a scaler and rotator block of the image processing system of FIG. 7, in accordance with an embodiment.

To help illustrate the scaler and the rotator block 50, FIG. 8 is a block diagram of the scaler block 56 and the rotator block 58 of the scaler and the rotator block 50 receiving input image data 70 and outputting processed image data 92. Since scaling image data may use substantially more time than rotating the image data, the scaling task may be associated with the lower priority context while the rotating task may be associated with the higher priority. Thus, in some embodiments, the processor(s) may perform a context switch from the context of the lower priority scaling task to the higher priority rotating task. The scaler block 56 and the rotator block 58 may include multiple processing blocks 72, 86 to carry out directional scaling, rotation, and/or other enhancement tasks. The image data processing circuitry 30 may also include these image processing blocks.

As previously mentioned, each of these tasks, such as the scaling task, rotation task, or another image enhancement task, may be associated with a priority level. Based on the priority level, the controller 40 (e.g., including or integrated with the processor(s) 12) may pause and switch configurations of the image data processing circuitry 30 to execute the higher priority task. As shown, the processing blocks 72 of the scaler block 56 may include, but are not limited to, a transform block 74, a noise statistics block 76, an angle detection block 78, a directional scaling block 80, an image enhancement block 82 and a vertical/horizontal scaling block 84. The processing blocks 86 of the rotator block 58 may include, but are not limited to, a degree rotation block 88 and a flip orientation block 90 (e.g., mirroring block).

The processing blocks 72, 86 of the scaler block 56 and/or the rotator block 58 may receive and/or process the input image data 70 in multiple color bases (e.g., red-green-blue (RGB), alpha-red-green-blue (ARGB), luma-chrominance (a YCC format, such as YCbCr or YUV), etc.) and/or bit depths (e.g., 8-bit, 16-bit, 24-bit, 30-bit, 32-bit, 64-bit, and/or other appropriate bit depths). Additionally, high dynamic range (HDR) image data (e.g., HDR10, perceptual quantizer (PQ), etc.) may also be processed. However, in some embodiments, it may be desirable to process or generate statistics from the input image data 70 utilizing a channel representing a luma value (e.g., a Y channel). A single luma channel may retain the content (e.g., edges, angles, lines, etc.) of the image for pixel statistics gathering and interpretation for directional scaling and enhancement. Depending on the color basis of the input image data 70, the transform block 74 may generate luma pixel data representing the target white, black, or grey point of the input image data 70. The luma pixel data may then be used by other processing blocks 54. By way of example, if the input image data 70 uses an RGB format, the transform block 74 may apply a weighting coefficient to each channel (i.e., the red, green, and blue channels) and combine the result to output a single channel of luma pixel data. Additionally or alternatively, the processing blocks 72 may use non-luma pixel data to gather and interpret pixel statistics as well as for directional scaling and enhancement.

In one embodiment, the noise statistics block 76 may receive luma pixel data corresponding to the input image data 70. The noise statistics block 76 may then process the luma pixel data through one or more vertical and/or horizontal filters and quantify a qualification for the luma pixel data corresponding to each pixel. The qualifying luma pixel data may be used to generate noise statistics, from which the noise statistics block 76 may identify patterns in the image data content, for example, for use in the image enhancement block 82. The image enhancement block 82 may take scaled image data and/or the input image data 70 and use tone detection, comparisons between a low resolution input and a high resolution input, and the noise statistics to enhance (e.g., sharpen) the image data generating enhanced image data.

The angle detection block 78 may also receive luma pixel data corresponding to the input image data 70. The angle detection block 78 may analyze SAD and DIFF statistics at multiple angles about a pixel of interest to identify angles corresponding to lines and/or edges within the input image data 70 content. These angles may then be used in the directional scaling block 80 to facilitate improved interpolation of new pixels generated when scaling to a higher resolution (e.g., twice the dimensions of the original image resulting in approximately four times as many pixels). The vertical/horizontal scaling block 84 may further scale the scaled image data to a higher or lower resolution to match the desired output resolution.

Additionally or alternatively to scaling the input image data 70, and as previously discussed, the processing blocks 86 of the rotator block 58 may rotate the input image data 70 before transmitting the processed image data 92. The degree rotation block 88 may rotate the input image data 70 by a predetermined rotation increment, such as by 10°, 15°, 45°, 90°, and/or 180°, to produce the rotated image. In particular, the degree rotation block 88 may rotate the entire image and/or blocks of the image (e.g., 96 pixels by 96 pixels, 128 pixels by 128 pixels, and so forth) of the input image data 70. The flip orientation block 90 may flip the entire image and/or bocks of the input image data 70 from an original orientation. In particular, the flip orientation block may horizontally and/or vertically flip the image with respect to an original orientation, for example, to correspond to a flipped orientation of the display 18 of electronic device 10 that may cause the controller 40 to rotate the input image data 70 prior to display on the display 18. After the input image data 70 has been scaled and/or rotated, the processed image data 92 to may be sent to the display driver 38 (e.g., of FIG. 7) to display on the display 18.

Figure 9:
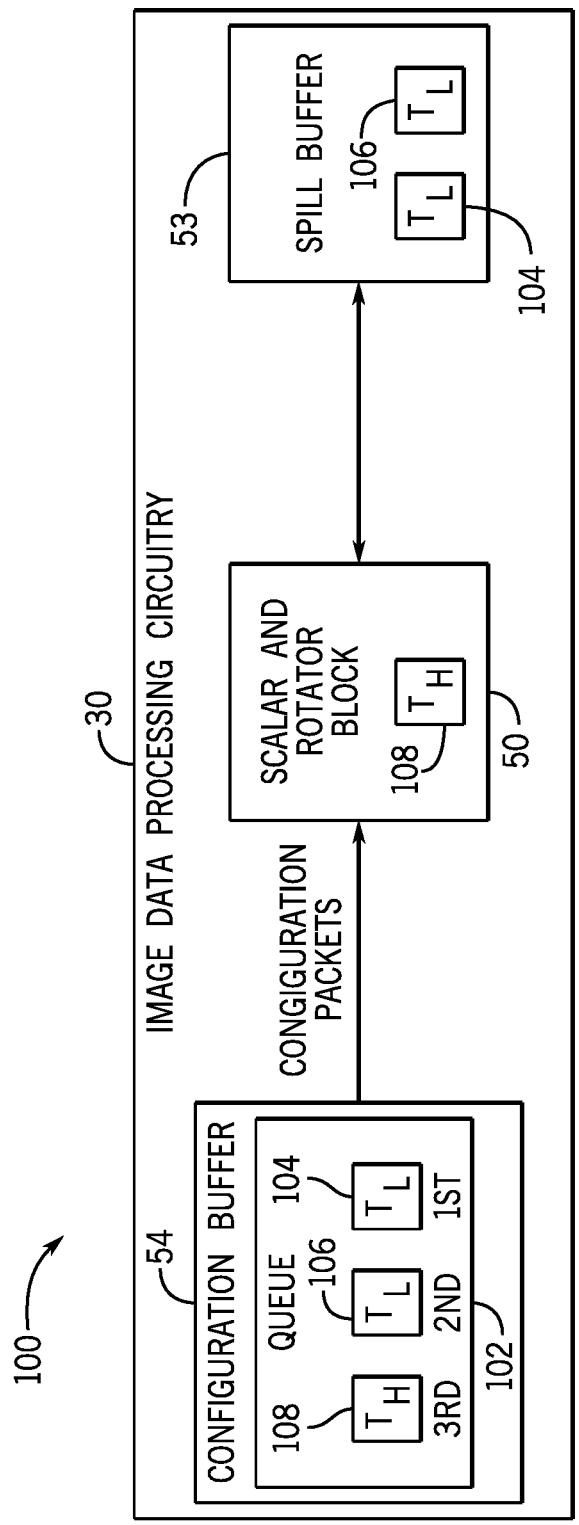
FIG. 9 is a block diagram of a context switch request for tasks executed by the scaler and rotator block, in accordance with an embodiment.

However, as previously mentioned, the controller 40 may configure the image data processing circuitry 30 for and executing a relatively lower priority adjustment or modification on the input image data 70 when a relatively higher priority task may be in queue (e.g., in the configuration buffer 54). The systems and methods described herein stop or pause execution of the lower priority task, store a state (e.g., configuration status) associated with the lower priority task in the spill buffer 53, subsequently and/or simultaneously configure the image data processing circuitry 30 for executing the higher priority task, and resume execution of the lower priority task after completing execution of the higher priority task. To illustrate, FIG. 9 depicts a flow diagram 100 of a context switch request in the image data processing circuitry 30. As shown, the configuration buffer 54 of the image data processing circuitry 30 may include a queue 102 of tasks to be performed using the image data processing circuitry 30. Each of the tasks may be associated with configuration data, such as for configuring the image data processing circuitry 30 (e.g., processing blocks 72, 86 of the scaler and rotator block 50) to configure the image data processing circuitry 30 to execute the tasks.

Here, the queue 102 includes a first lower priority task 104, a second lower priority task 106, and a higher priority task 108, which may be a third task. As previously mentioned, the configuration buffer 54 may include a FIFO buffer, such that the configuration buffer 54 outputs the configuration data for the tasks on a first-in-first-out basis (e.g., configuration data for the first task, the second task, the third task, and so forth). Thus, the controller 40 may configure blocks of the image data processing circuitry 30 for the first lower priority task 104 and the second lower priority task 106 before reconfiguring for the higher priority task 108. That is, the configuration data may be associated with these tasks and may configure the processing blocks 72, 86 of the scaler and rotator block 50 for the first lower priority task 104, the second lower priority task 106, and then the higher priority task 108. Although the following descriptions describe the higher priority task as a rotating task and the lower priority task as a scaling task, which represents a particular embodiment, the higher priority task and/or the lower priority task may be associated with other image enhancing contexts in which one image enhancing context has a relatively higher priority than a second image enhancing task (e.g., the relatively lower priority task).

Briefly, and as will be described in detail with respect to FIG. 10, the controller 40 may pause a presently executing lower priority task (e.g., a scaling task) executing on the scaler and rotator block 50, such as the first lower priority task 104, and reconfigure the scaler and rotator block 50. In particular, the controller 40 may reconfigure the processing blocks of the scaler and rotator block 50 for the higher priority task 108 to perform the corresponding task. The controller 40 may also store the state of the paused first lower priority task 104 to the spill buffer 53, which stores the last state or configuration status of the paused or stopped task. In this manner, after the scaler and rotator block 50 executes the higher priority task 108, the controller 40 may reconfigure the scaler and rotator block 50 to finish executing the first lower priority task 104. In some embodiments, the spill buffer 53 may also store configuration data for other lower priority tasks in the queue 102 that may have been skipped to configure the scaler and rotator block 50 for the higher priority task 108. The order of the one or more lower priority tasks may also be stored in the spill buffer 53.

Figure 10:
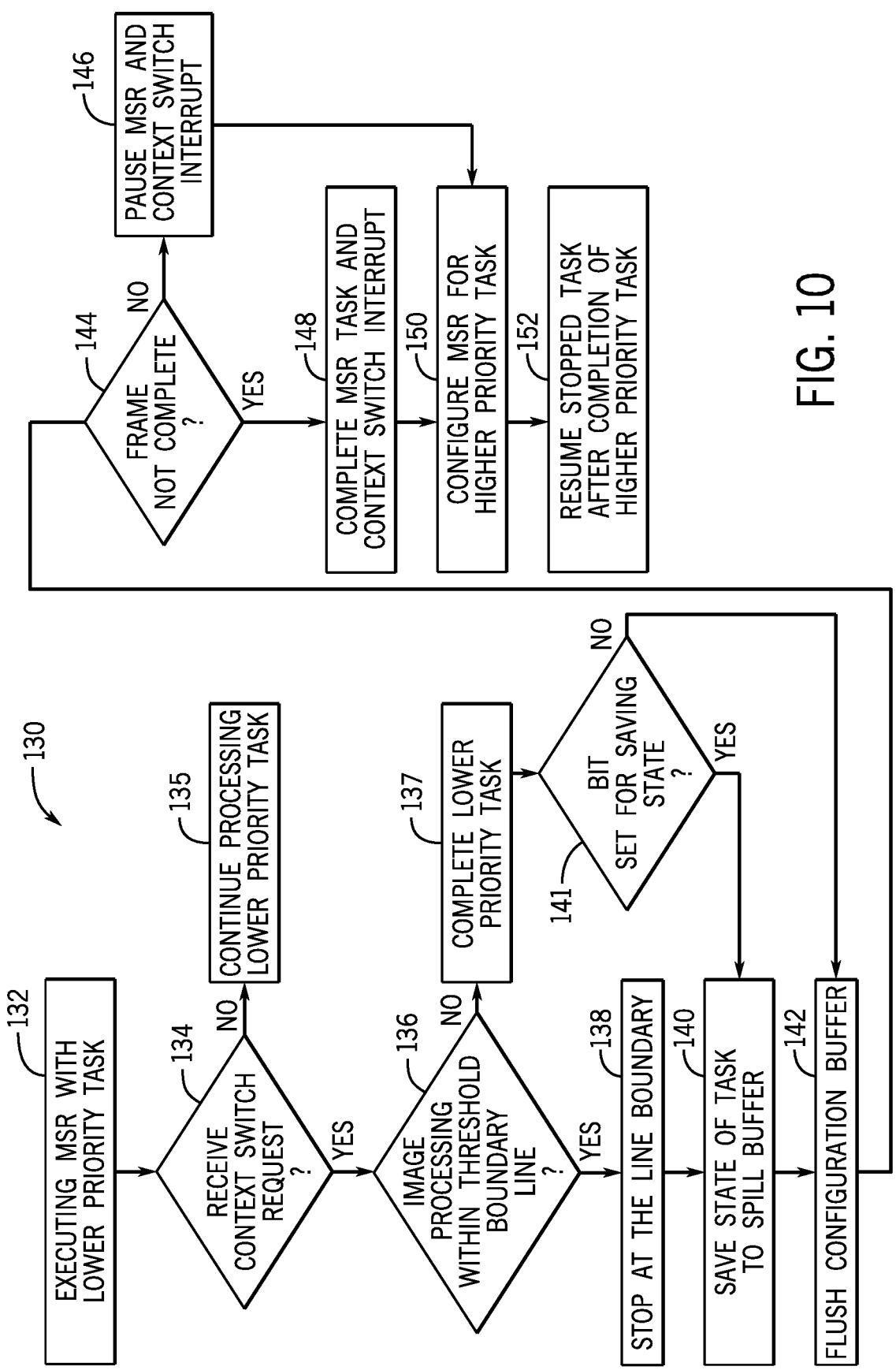
FIG. 10 is a flowchart of a process for performing the context switch request using the scaler and rotator block, in accordance with an embodiment.

To illustrate the process for fulfilling the context switch request (e.g., context of priority), FIG. 10 illustrates a process 130 for performing the context switch request. In some embodiments, the process 130 may be implemented by executing instructions stored in a tangible, non-transitory, computer-readable medium, such as the one or more memory devices 14, using a processor, such as the one or more processors 12 and/or the controller 40. While the process 130 is described using steps in a specific sequence, it should be understood that the present disclosure contemplates that the described steps may be performed in different sequences than the sequence illustrated, and certain described steps may be skipped or not performed altogether. Although the following discussions describe the process 130 performed with respect to a memory-to-memory scaler and rotator (MSR) (e.g., MSR engine), such as the scaler and rotator block 50, the process 130 may additionally or alternatively be implemented using other processing blocks of the image data processing circuitry 30. Moreover, although the following discussions describe the process 130 performed with respect to a context switch for priority or hierarchy of task types, the process 130 may additionally or alternatively be implemented for other contexts (e.g., power consumption required to perform a task type, etc.). In general, and as will be described herein, initiating the context switch using the MSR, includes 1) allocating a buffer to store a context state and provide the address for the buffer for the lower priority task, 2) programming the configuration of the MSR for the higher priority task, and/or 3) setting a context switch request bit to notify the MSR to perform the context switch.

As shown, the process 130 includes the controller 40 configuring the MSR (e.g., the scaler and rotator block 50 of the image data processing circuitry 30) for and executing (process block 132) a lower priority task. Specifically, the controller 40 may configure the MSR of the image data processing circuitry 36 to perform the lower priority task based at least on the input image data 70 and/or an orientation of the display 18 of the electronic device 10. For example, the lower priority task may include scaling the input image data 70 for a higher resolution display 18 than supported by the original format of the input image data 70 for display. The scaling task may be time consuming and the orientation of the electronic device 10 may change (e.g., from being held vertically to horizontally). Thus, the controller 40 correspondingly change orientation of the display 18 to provide the same view of the image displayed on the display 18 prior to changed orientation of the display 18. For example, a user of the electronic device 10 may hold the electronic device 10 with the display 18 in an original orientation (e.g., held vertically) and then turn the electronic device 90° with respect to the original orientation (e.g., held horizontally). As such, unless the user also changes their viewing by 90° (e.g., tilts head), the image on the display 18 will be orientated at 90°. Thus, to adjust for the change in orientation of the display 18 and to continue providing the image in the same or original orientation with respect to the user, the controller 40 may automatically rotate the image by −90°.

In such instances, providing the image to be in the same viewing orientation prior to the change in orientation of the display 18 may be a higher priority than scaling the input image data 70. Thus, prior to or while scaling the input image data 70, the controller 40 may switch configuration of the MSR to rotate the input image data 70. As such, the rotating task may be higher priority task or a relatively higher priority task than the scaling task.

The controller 40 may determine whether (decision block 134) the controller 40 receives a context switch request. That is, the controller 40 receives a request for the MSR to switch from executing a present lower priority task to a different task (e.g., a relatively higher priority task). The switch request may be based on a particular context, such as the context of the task type. The task types may be associated with the different level of priorities, such as high priorities, intermediate priorities, or low priorities. Thus, a request to switch tasks in the context of a particular task type may be associated with a higher priority than the presently executed task type. The controller 40 may receive a manual request (e.g., via user input) or automatically generate the request in response to the input image data 70, the display 18, and/or the electronic device 10 meeting certain conditions. For example, the conditions may include a change to the orientation of the display 18 (e.g., rotated) and thus, the controller 40 may automatically generate the context switch request to adjust the input image data 70 (e.g., rotate the input image data 70 to correlate to the orientation of the display 18). Furthermore, the rotating task may be implemented faster than the scaling task if the scaling task is presently executed on the input image data 70. In particular, the MSR may process the input image data 70 for scaling, and the scaling task may be incomplete prior to a rotating task being in the queue 102. The rotating task may be higher priority than the scaling task. As such, the controller 40 may pause/stop and switch the configuration of the MSR to execute the rotating task instead of the scaling task. In some embodiments, the MSR may switch the configuration of the MSR prior to executing the lower priority task. Thus, the rather than pausing the lower priority task, the MSR skips the lower priority task and executes the higher priority task.

If the controller 40 does not receive the context switch request, the controller 40 may continue (process block 135) processing the lower priority task. That is, the controller 40 may keep the present configuration of the MSR to continue performing the presently executed lower priority task. For example, the MSR may be configured for performing the scaling task (e.g., the lower priority task) as long as a higher priority task, such as the rotating task, is not in the queue 102 that causes the controller to generate the context switch request.

However, if the controller does receive (e.g., generate) the context switch request (e.g., a software command), the controller 40 may determine whether (process block 136) the image processing is within a threshold bit boundary. In particular, the controller 40 may cause the MSR to stop at an earliest known or predetermined boundary. Although the following descriptions describe the known boundary as a 32-line boundary, which represents a particular embodiment, the boundary may be greater than or less than the 32-line boundary (e.g., 4-line boundary, 16-line boundary, 64-line boundary, and so forth). Here, the controller 40 may cause the MSR to stop at the earliest 32-line boundary within a vertical strip upon receiving the context switch request.

If the controller 40 determines that the image processing is not within the threshold line boundary, then the controller 40 may cause the MSR to complete (process block 137) the lower priority task. After the lower priority task is completed, the controller 40 may configure the MSR for the higher priority task. In some embodiments, and after the lower priority task is completed, the controller 40 may process the higher priority tasks (e.g., in a first-in-first-out order for the higher priority tasks) before the lower priority tasks if the queue 102 includes lower priority tasks earlier in queue 102 than the higher priority tasks.

In some embodiments, the controller 40 may determine that the context switch request is received after a full frame of image data has completed and before the next frame of image data has started. In either case, the state of lower priority task may not be saved in a buffer since the MSR completes execution of the lower priority task. In general, the controller 40 may write (e.g., via the DMA 48) a reserved value of 0x0 as a context switch task identification (ID) associated with the lower priority task to indicate to the controller 40 (e.g., software run by the controller 40) that a frame has not been interrupted in order to process the context switch request. The controller 40 (e.g., through the software) may manage tasks and resume the paused context. The controller 40 may also ensure that 0x0 is not used as a current task ID for a presently executed task (e.g., a higher priority task).

If the controller 40 determines that the image processing is within the threshold line boundary, then the controller 40 may cause the MSR to stop (process block 138) at the line boundary (e.g., the earliest possible 32-line boundary after being request to stop a context). As will be described herein, the controller 40 may also flush all other tasks in the configuration buffer 54, such as the lower priority tasks and/or other higher priority tasks having the same hierarchy (e.g., based on FIFO order) that have been queued in the queue 102 and not started within the MSR.

The controller 40 may assert an interrupt to stop the MSR from executing the lower priority task. Specifically, the controller 40 may assert one or more (e.g., four) interrupts to stop the image processing at the line boundary. For example, the interrupts may include an interrupt that indicates a successful switch to a new task (e.g., context switch done), an interrupt that indicates an error while switching (e.g., context switch error), and/or an interrupt that indicates a frame of image data was completed prior to switching to the new task (e.g., context switch frame done).

Moreover, the context switch request may be associated with a bit. Specifically, on or more registers may support the static and/or dynamic context switching. By way of example, a first register may store a single bit specifying to hardware (e.g., the MSR) to switch contexts while a second register may store a single bit specifying to hardware to resume a previously stopped context. A third register may store lower 32-bits of a base address of the spill buffer 53 for context to be saved (e.g., restored from a particular address). A fourth register may store upper 4-bits of the base address of the spill buffer 53 for context to be saved (e.g., restored from a particular address). A fifth register may store a single bit specifying whether a base address of the spill buffer 53 is valid. A sixth register may store 32-bit value specifying the size of the spill buffer 53. Additional registers may be used to save a hardware state and may be specified as a volatile state. Thus, the controller 40 may use one or more of these registers, such as setting the first register indicating execution of the switch request, to carry out the context switch request for executing the higher priority task while saving the state of the lower priority task in the spill buffer 53.

After the controller 40 stops execution of the lower priority task on the MSR, the controller 40 may save (process block 140) the state of the stopped task to the spill buffer 53. Specifically, the controller 40 may save the current or present volatile state of the lower priority task. The state may be specified by configuration registers, context switch addresses, and/or the context switch sizes. In some instances, the controller 40 may determine whether (decision block 141) a bit is set for saving the state of the completed task (e.g., lower priority task was not paused since image processing was past the line boundary). If the bit is set, the controller 40 may also store (process block 140) the state of the lower priority task (e.g., state of lower priority task completion).

Upon saving the state, the controller 40 may flush (process block 142) out the configuration buffer 54 and automatically start the new task for which the context switch was requested (e.g., higher priority task), programming the configuration buffer 54 for the new task (e.g., higher priority task). The configuration buffer 54 may be programmed this way until the context switch process has completed (e.g., the MSR has finished executing the higher priority task). In some embodiments, the controller 40 may generate an interrupt indicating that the current task was successfully paused and a context switch to the new task was executed.

After saving the state of the lower priority task (e.g., stopped or completed) to the spill buffer 53, the controller 40 may determine whether (decision block 144) the MSR has completed the frame of the input image data 70. In general, upon completing each frame, a programmable task ID value is copied into a read-only task ID register that the controller 40 may use to associate with each completed frame. If several frames finish executing, then the read-only register may include only the task ID associated with the last completed frame. When a context switch is successfully executed, the programmable task ID may be copied to a read-only register (e.g., context switch task ID) prior to asserting interrupts indicating that the MSR completed the context switch and/or indicating that the MSR has completed the frame being context switched out so that the controller 40 may associate the frame that was switched out with a task ID. If the controller 40 does not save or write a state to the spill buffer 53 (e.g., due to frame completion or the frame not starting), then the controller 40 may write a value of 0x0 to the context switch task ID to indicate that no frame has been interrupted in order to process the context switch request. The controller 40 may also ensure that 0x0 is not used as the current task ID.

If the MSR has not completed processing the frame of the input image data 70, then the controller 40 may pause (process block 146) the MSR executing the task and generate the context switch interrupt. On the other hand, if the MSR has completed processing the frame of the input image data 70, then the controller 40 may complete (process block 148) the MSR task and generate the context switch interrupt. In either case, the controller 40 generates the context switch interrupt to indicate a switch in tasks.

In general, the controller 40 may save the state of the lower priority task after the MSR stops processing the lower priority task at the 32-line boundary and/or after completing the frame of the input image data 70 (e.g., due to receiving context switch after passing the 32-line boundary). When the MSR completes the frame, the controller 40 may save the state in response to determining that a control bit set (e.g., via the controller 40 by processing software) requesting to save statistics, and then generate the interrupt indicating a successful context switch. However, if the MSR does not complete the frame, the controller 40 may automatically (e.g., without checking for a bit) save the state prior to switching the MSR to executing the new higher priority task, and then generate the interrupt indicating a successful context switch.

Upon the successful context switch, the controller 40 may configure (process block 150) the MSR for the higher priority task. That is, different processing blocks of the MSR may be initialized to execute the higher priority task. By way of example, the higher priority task may include a rotating task and the controller 40 may configure the degree rotation block 88 and flip orientation block 90 of the MSR (e.g., the scaler and rotator block 50) to perform the rotating functions.

In some embodiments, the controller 40 may resume (process block 152) execution of the stopped lower priority task after the MSR completes the higher priority task. The controller 40 may retrieve data from the spill buffer 53 to determine state and/or configuration associated with the paused context. As previously mentioned, the controller 40 may specify parameters of the spill buffer 53 that indicate the paused context that may be resumed (e.g., the 32-bit base address of the spill buffer for restoring the context and/or the size of the spill buffer 53 corresponding to configuration data). Additionally, the controller 40 may issue a command to retrieve the configuration for the paused context. The controller 40 may also set a context switch resume bit for the MSR to restore state from the spill buffer 53 prior to completing the paused context. The MSR may configure registers and over-write the volatile configuration registers that are specified within the spill buffer 53. The resume bit may be set prior to programming a start register, which causes the MSR to start and repeat tasks until the configuration buffer 54 is empty. The controller 40 may also program the current task ID to correlate to the context switch task ID that is saved in the spill buffer 53 for a resume frame.

In some embodiments, the controller 40 may receive a context switch request for a resumed task. That is, the controller 40 may receive another context switch request for a higher priority task after resuming the lower priority task. Thus, the controller 40 may receive more than one context switch request for an image. The context of subsequent context switch requests may include the same context (e.g., the first context switch request and the second context switch request are associated with the same task) or different context (e.g., the first context switch request and the second context switch request are associated with different tasks) that are higher priority than the lower priority task presently executing. In some embodiments, the context switch request may include switching from a higher priority task to an even higher priority task. In such embodiments, the controller 40 may resume executing the higher priority task after completing the even higher priority task. Thus, the higher priority tasks may be associated with different levels of higher priority, and as such, the context switches (e.g., an initial context switch or subsequent context switches) may include executing or resuming higher priority tasks in descending order (e.g., from a highest level of higher priority to a lowest level of higher priority). In some embodiments, the context switch requests for the higher priority tasks may include an indication of a sub-priority (e.g., a sub-priority within the higher priority).

Additionally or alternatively, the context switch requests may involve new image data and/or new image modifying tasks. That is, the controller 40 may apply the context switching techniques to one or more images, one or more frames, one or more blocks of the input image data for an image, and so forth. Thus, although the descriptions described herein discuss the context switch with respect to a single context switch for an input image, the systems and methods described herein may apply to one or more context switches associated with one or more higher priority tasks and/or to one or more images, one or more frames, and/or one or more blocks of image data.

In some embodiments, another register may record a number of clock cycles associated with completing a task (e.g., from start to finish). For example, the register may save the number of clock cycles for performing an entire context switching (e.g., saving the spill buffer 53 and context switch overhead). As such, when the controller 40 resumes a paused lower priority task, the number of clock cycles may be determined from the spill buffer 53, including spill buffer restoration and any resume overhead cycles, and add to the count of cycles from start to finish for the resumed cycle.

In this manner, the techniques described herein may allow switching between tasks (e.g., in the context of priority or task type) executed by the image data processing circuitry 30 of the image data processing circuitry 30. The tasks that take a substantially long time to complete or run past an expected time for completion, may be paused during execution or stopped prior to execution. Additionally, the state of the paused or stopped task may be stored and retrieved to allow resuming the task at the point at which it was stopped, providing a low latency context switch between tasks.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic device comprising:
a display panel; and
an image processing circuitry configured to:
receive input image data corresponding to an image to display on the display panel;
modify the input image data by executing a first context task;
receive a context switch request;
pause modification of the input image data by pausing execution of the first context task;
store a configuration state associated with the first context task; and
switch to modifying the input image data by executing a second context task.

2. The electronic device of claim 1, wherein the image processing circuitry is configured to
resume modifying the input image data by executing the first context task based on the stored configuration state after completing modification of the input image data by executing the second context task.

3. The electronic device of claim 2, wherein the configuration state is stored in a spill buffer.

4. The electronic device of claim 3, wherein the spill buffer stores an address for the spill buffer, a task identification (ID) of the first context task, a size of the spill buffer, or any combination thereof.

5. The electronic device of claim 3, wherein configuration data associated with the first context task, the second context task, or a combination thereof, are stored in a configuration buffer, and wherein the configuration buffer is different than the spill buffer.

6. The electronic device of claim 5, wherein the configuration buffer comprises a first-in-first-out shadow buffer.

7. The electronic device of claim 1, wherein the first context task is associated with a relatively higher priority context and the second context task is associated with a relatively lower priority context.

8. The electronic device of claim 1, wherein the first context task comprises a scaling task or a rotating task, and wherein the second context task comprises the other of the scaling task and the rotating task.

9. The electronic device of claim 1, wherein the pause modification of the input image data comprises a determination that the modification of the input image data is at a threshold line boundary.

10. The electronic device of claim 9, wherein the threshold line boundary comprises an earliest 32-line boundary within a vertical strip.

11. The electronic device of claim 1, wherein the context switch request is associated with setting a bit indicating a switch from the first context task.

12. Image processing circuitry configured to:
receive an input image corresponding to an image;
modify the input image based on a first context;
receive an indication to modify the input image based on a second context;
determine that the modification of the input image is within a threshold line boundary;
stop modification of the input image;
store a state associated with the modification of the input image based on the first context; and
switch to modifying the input image based on the second context.

13. The image processing circuitry of claim 12, wherein a first configuration of processing blocks of the image processing circuitry corresponds to the first context and a second configuration of the processing blocks of the image processing circuitry corresponds to the second context, and wherein the first configuration and the second configuration are different.

14. The image processing circuitry of claim 12, wherein the image processing circuitry comprises a memory-to-memory scaler and rotator (MSR) engine.

15. The image processing circuitry of claim 12, wherein the image processing circuitry configured to:
resume modifying the input image based on the first context based on the stored state after completing modification of the input image based on the second context.

16. A tangible, non-transitory, computer-readable medium, comprising instructions that, when executed by a processor, cause operations to be performed comprising:
receiving an input image corresponding to an image for display on a display panel;

modifying the input image based on a first context corresponding to a first configuration of image processing blocks of a display pipeline of the display panel;
receiving a context switch request to modify the input image based on a second context corresponding to a second configuration of the image processing blocks;
determining that the modification of the input image is within a threshold line boundary;
stopping modification of the input image;
storing a configuration state associated with the modification of the input image based on the first context in a spill buffer;
modifying the input image based on the second context; and
resuming modifying the input image based on the first context using the stored configuration state in response to completing modification of the input image based on the second context.

17. The tangible, non-transitory, computer-readable medium of claim 16, wherein the first context corresponds to a higher priority task and the second context corresponds to a lower priority task.

18. The tangible, non-transitory, computer-readable medium of claim 16, wherein the context switch request comprises one or more context switch requests.

19. The tangible, non-transitory, computer-readable medium of claim 18, wherein at least one of the one or more context switch requests applies to a new input different than the input image.

20. The tangible, non-transitory, computer-readable medium of claim 19, wherein the first context comprises a scaling task that corresponds to a first time period for completion and the second context comprises a rotating task that corresponds to a second time period for completion, less than the first time period.

* * * * *